(12) United States Patent
Drako et al.

(10) Patent No.: US 9,744,975 B1
(45) Date of Patent: Aug. 29, 2017

(54) ADAPTIVE TORQUE OPERATING SYSTEM AND ELECTRIC MOTOR CONTROL APPARATUS

(71) Applicants: Dean Drako, Austin, TX (US);
Shivinder Singh Sikand, Santa Cruz, CA (US)

(72) Inventors: Dean Drako, Austin, TX (US);
Shivinder Singh Sikand, Santa Cruz, CA (US)

(73) Assignee: R MOTOR COMPANY, Austin, TX (US)

( * ) Notice: Subject to any disclaimer, the term of this patent is extended or adjusted under 35 U.S.C. 154(b) by 0 days.

(21) Appl. No.: 14/644,195

(22) Filed: Mar. 10, 2015

Related U.S. Application Data

(60) Provisional application No. 61/950,229, filed on Mar. 10, 2014.

(51) Int. Cl.
*B60W 10/06* (2006.01)
*B60W 50/08* (2012.01)
*B60W 10/16* (2012.01)

(52) U.S. Cl.
CPC .......... *B60W 50/085* (2013.01); *B60W 10/16* (2013.01); *B60W 2710/083* (2013.01); *B60W 2710/12* (2013.01); *B60W 2720/26* (2013.01)

(58) Field of Classification Search
CPC ... A63C 17/12; B60G 17/0195; B60W 50/06; B60W 50/082; B60W 10/06; B60W 10/08; B60W 50/085; B60K 6/442; B60K 17/16; B60K 23/0808; B60D 5/0472; F02N 11/0822; G01L 5/161

See application file for complete search history.

(56) References Cited

U.S. PATENT DOCUMENTS

| | | | | |
|---|---|---|---|---|
| 5,569,857 | A * | 10/1996 | Miyazaki | G01L 5/161 73/785 |
| 6,295,496 | B1 * | 9/2001 | Shinmura | B62D 5/0472 180/446 |
| 9,315,189 | B2 * | 4/2016 | Mould | B60W 10/08 |
| 2001/0029423 | A1 * | 10/2001 | Nishida | B60K 23/0808 701/89 |
| 2001/0032743 | A1 * | 10/2001 | Kamen | A63C 17/12 180/7.1 |

(Continued)

*Primary Examiner* — Yuri Kan
(74) *Attorney, Agent, or Firm* — Patentry; Peter G H Hwang

(57) ABSTRACT

An apparatus transforms vehicle operator intentions to wheel propulsion controls using an operator interface, sensors, a torque budgeting circuit, at least four motor controllers, and a vehicle/operator personality profile store. The store provides instructions and parameters which control dynamic vehicle responsiveness and reflect an operator's personality. The instructions and parameters are accessible by an application programming interface (API). Vehicle characteristics may be recorded by operating the vehicle through a prescribed route or evolution. A revised performance profile of a vehicle can be installed when the vehicle is reconfigured. Performance of a vehicle is modified to mimic a different vehicle by installing a new software dynamic performance profile. The API enables an open architecture for developers to customize vehicle dynamics without cutting metal.

2 Claims, 5 Drawing Sheets

(56) References Cited

U.S. PATENT DOCUMENTS

| | | | |
|---|---|---|---|
| 2006/0048988 A1* | 3/2006 | Dreibholz | B60K 6/442 180/213 |
| 2006/0122741 A1* | 6/2006 | Bassiere | B60W 50/06 701/1 |
| 2006/0173601 A1* | 8/2006 | Bassiere | B60G 17/0195 701/53 |
| 2007/0184929 A1* | 8/2007 | Piyabongkarn | B60K 17/16 475/84 |
| 2007/0193802 A1* | 8/2007 | Hu | B60W 10/06 180/197 |
| 2010/0055649 A1* | 3/2010 | Takahashi | B60W 50/082 434/66 |
| 2015/0006064 A1* | 1/2015 | Dextreit | F02N 11/0822 701/112 |

* cited by examiner

ADAPTIVE TORQUE OPERATING SYSTEM AND ELECTRIC MOTOR CONTROL APPARATUS

CROSS-REFERENCES TO RELATED APPLICATIONS

This non-provisional application benefits from its provisional application 61/950,229 filed on Mar. 10, 2014 which is incorporated by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The field of the invention is control signals for an electric vehicle directional and power control system: electronic differentials, torque vectoring, poly-phase electric motors.

Description of the Related Art

It is known that torque vectoring is provided to all wheel drive vehicles.

Torque vectoring is a known technology employed in automobile differentials. A differential transfers engine torque to the wheels. Torque vectoring technology provides the differential with the ability to vary the power from one wheel to another. This method of power transfer has recently become popular in all-wheel drive vehicles. Some newer front-wheel drive vehicles also have a basic torque vectoring differential. As technology in the automotive industry improves, more vehicles are equipped with torque vectoring differentials.

Differentials are known to refer to a particular type of simple planetary gear train that has the property that the angular velocity of its carrier is the average of the angular velocities of its sun and annular gears. This is accomplished by packaging the gear train so it has a fixed carrier train ratio $R=-1$, which means the gears corresponding to the sun and annular gears are the same size. This can be done by engaging the planet gears of two identical and coaxial epicyclic gear trains to form a spur gear differential. Another approach is to use bevel gears for the sun and annular gears and a bevel gear as the planet, which is known as a bevel gear differential.

The fundamental concept of torque vectoring depends on the principles of a standard differential. A differential shares available torque between wheels. This torque sharing ability improves handling and traction. Torque vectoring differentials were originally used in racing. The technology has slowly developed and is now being implemented in a small variety of production vehicles. The most common use of torque vectoring in automobiles today is in all-wheel drive vehicles.

The main goal of torque vectoring is to vary a share of torque between or among wheels coupled to a motor or engine. Differentials generally consist of only mechanical components. A torque vectoring differential often includes an electronic monitoring system in addition to standard mechanical components. This electronic aspect is only to direct the mechanical differential when and how to share the torque.

Torque vectoring differentials on front or rear wheel drive vehicles are less complex than all-wheel drive differentials. The two wheel differential only shares torque between two wheels.

A front-wheel drive differential must take into account several factors. It must monitor rotational and steering angle of the wheels. As these factors vary during driving, different forces are exerted on the wheels. The differential monitors these forces, and adjusts torque accordingly. Many front-wheel drive differentials can increase or decrease torque transmitted to a certain wheel by changing the ratio between the two wheels. This ability improves a vehicle's capability to maintain traction in poor weather conditions. When one wheel begins to slip, the differential can reduce the torque to that wheel, effectively braking the wheel. The differential also increases torque to the opposite wheel, helping balance the power output and keep the vehicle stable. A rear-wheel drive torque vectoring differential works the same way as a front-wheel drive differential, but doesn't monitor the steering angle.

Most mechanical torque vectoring differentials are on all-wheel drive vehicles. A first torque vectoring differential varies torque between the front and rear wheels. This means that under normal driving conditions, the front wheels receive a set percentage of the engine torque, and the rear wheels receive the rest. If needed, the differential can transfer torque between the front and rear wheels to improve vehicle performance. This is a zero sum game.

For example, a vehicle might have a standard torque distribution of 90% to the front wheels and 10% to the rear. Under harsh conditions, the differential changes the distribution to 50/50. This new distribution spreads the torque more evenly between all four wheels. Having more even torque distribution increases the vehicle's traction.

There are more advanced torque vectoring differentials as well. These differentials build on basic torque transfer between front and rear wheels. They add the capability to share torque between a pair of front wheels or between a pair of rear wheels.

The differential monitors each wheel independently, and distributes available torque to match current conditions. One known mechanism first allocates available power between front and rear pairs and subsequently shares the amount of torque transmitted to each rear wheel by a second differential in series. The front wheels, however, do not receive different amounts of torque. Another known torque vectoring system adds a third mechanical differential to share torque provided to the front pair of wheels.

Another known system supports 4 electric motors coupled by gearboxes and axles to individual wheels. Negative torque is produced electrically rather than applying brakes as mechanical systems do.

As is known, Mercedes Benz has provided a purpose built electric vehicle with four synchronous independent electric motors. The engines make a total of 740 (750 PS) and 1,000 Nm (737.5 lb-ft), which is split equally among the four wheels in normal driving conditions. Because all four motors are electrically-powered independently of one another this potentially offers higher speed wheel control.

The conventional Mercedes approaches are still mechanically linking each motor to its wheel by a reduction gearbox and axle. A production Tesla utilizes a single 3 phase AC induction motor and has a conventional mechanical power train. A conventional mechanical power train provides three differentials and reduction gearboxes. A conventional power train must have the same reduction ratio from a single engine to the front axis as well as to the rear axis to enable all wheel drive. A dual motor system may have two reduction ratios.

It is known that torque vectoring is particularly suited to electric vehicles. Lotus has been evaluating and developing new systems and approaches. When a driver turns the steering wheel, he or she expects the vehicle to change direction (yaw). The vehicle does not, however, respond immediately because tires take time to build up lateral forces, and the actual vehicle response may not be exactly what is desired.

Particularly at high vehicle speed, after an initial delay period (a fraction of a second) the vehicle yaw rate can overshoot and oscillate before settling on a steady value. At very high speeds, or if the vehicle's suspension is poorly tuned or the operator poorly skilled, the oscillations can increase and the vehicle can go out of control. Even at lower speeds, the oscillations can make the vehicle feel less stable and the driver may need to successfully make multiple steering adjustments to follow the intended path.

Conventional vehicle suspension is tuned through bump steer, static settings, etc., to minimize the oscillations and to give a stable response at all vehicle speeds and loading conditions, but any increase in stability is at the expense of vehicle agility and the vehicle response can become disappointing.

It is known that when a vehicle has independent control over the drive and braking torques to each wheel (for instance, electric hub motors), there is an opportunity to improve the vehicle yaw response.

One approach has been by increasing the drive torque to a pair of tandem wheels (e.g. port), and creating an effective braking torque at the opposite pair of tandem wheels (e.g. starboard). These drive torques are in addition (or subtracted from) to the normal drive torques required to control vehicle speed. In other words, turning or yaw occurs when one side of a car is traveling faster than the other side.

Maximum Yaw Turning Moment (Torque)

Independent of the steered angle of the wheels, a yaw moment is generated when the resultant vector of the tire forces is perpendicular to a line through the center of gravity. The resultant force is the vector sum of lateral force and driving/braking force. The maximum yaw moment (if required) is obtained when the resultant of the tire forces is perpendicular to a line from the center of the tire to the vehicle center of gravity.

There are two main advantages in using these resultant forces to control vehicle yaw (as opposed to purely tire lateral forces):

The resultant force can act at a greater lever arm, increasing the maximum moment available.

Yaw rate can be controlled without requiring multiple steering adjustments.

If the forces are correctly controlled, the vehicle can be made to respond more quickly to a steering input and instability can be reduced.

To do this, the control of the wheel torques needs to consider:

Increasing torque on the one side must be balanced by a reduction on the other side to avoid unnecessary acceleration.

Vertical load on each wheel—particularly as the vehicle corners, the vertical load on the inner wheels reduce and drive/braking torque may cause wheel spin or wheel lock-up.

The addition of drive or braking torques at the rear may result in loss of rear grip—leading to loss of control.

Any response must be safe and predictable.

Therefore, simply distributing the torque based on steering wheel angle would achieve more yaw response (for the same steering input), but it may not create any improvement in stability. It could even make the vehicle behavior less predictable.

One known approach is yaw rate feedback. For any steer angle and forward velocity, an ideal yaw rate can be calculated by assuming no tire slip, and using the wheel geometry to approximate the turn radius. The measured yaw rate is then used as feedback, giving a yaw error. A differential term (yaw acceleration) is included for damping. The output is used to control the distribution of drive torque; i.e. for a left turn, an additional torque is applied to the right, with an equal braking torque applied to the left. These torques are in addition to the 'normal' drive torque that maintains the vehicle forward velocity.

A limitation to conventional feedback control is that the system relies on measured yaw rate as an input signal. This measured response data will also include 'noise' (high frequency waves created by road inputs and general vibration). In order to use the signal, the signal must be filtered. This unfortunately creates a time delay in the signal, and the feedback becomes too late creating overshoot and oscillations in the response.

Electric Motor or Traction Drive Controls

Transmitting Positive or Negative Values in Newton Meters.

It is known that Direct Torque Control is used in variable frequency drives to control the torque (and thus finally the speed) of three-phase AC electric motors. This involves calculating an estimate of the motor's magnetic flux and torque based on the measured voltage and current of the motor.

See patents by Depenbrock, Takahashi and Noguchi on direct self control and direct torque control.

U.S. Pat. No. 4,678,248 discloses a method for controlling a rotating-field machine supplied from an inverter, the output voltage system of the inverter being variable with respect to amplitude, phase and frequency includes supplying amplitudes of stator flux components formed from measured stator current components and stator voltage components as actual value of a flux control loop, and changing the phase and frequency of the inverter output voltage system with a flux control as a function of a predetermined stator flux reference value by directly setting-in the switching state of the inverter and an apparatus for carrying out the method.

It is known that Vector motor control or field-oriented control provides control over three-phase AC electric motors by adjusting the output current of a VFD inverter in Voltage magnitude and Frequency. FOC is a control technique that is used in AC synchronous and induction motor applications that was originally developed for high-performance motor applications which can operate smoothly over the full speed range, can generate full torque at zero speed, and is capable of fast acceleration and deceleration but that is becoming increasingly attractive for lower performance applications as well due to FOC's motor size, cost and power consumption reduction superiority. Not only is FOC very common in induction motor control applications due to its traditional superiority in high-performance applications, but the expectation is that it will eventually nearly universally displace single-variable scalar volts-per-Hertz (V/f) control.

What is needed is an improved apparatus and method to easily modify dynamic wheel control to customize a driving experience for energy and torque budgeting torque at each wheel.

BRIEF SUMMARY OF THE INVENTION

An apparatus transforms vehicle operator intentions to wheel propulsion controls using an operator interface, sensors, a torque budgeting circuit, at least four motor controllers, and a vehicle/operator personality profile store. A non-transitory computer readable medium coupled to a processor provides instructions and parameters that control dynamic vehicle responsiveness and reflect an operator's personality. The instructions and parameters are accessed by an application programming interface (API). Vehicle characteristics may be recorded by operating the vehicle through a prescribed route or evolution. A revised performance profile of a vehicle can be installed when the vehicle is reconfigured. Performance of a vehicle is modified to mimic a different vehicle by installing a new software dynamic performance profile. The API enables an open architecture for developers to customize vehicle dynamics without cutting metal. Vehicle characteristics and driver skill level are parameterized profiles which control the torque budgeting circuit and which can be updated by machine learning or downloaded files.

A system for predictive torque budgeting receives traction estimates for impending road conditions. Traction measurements from previously recorded measurements can be retrieved using global positioning coordinates. Road geometry and incline is predicted from a stored 3D map. Traction measurements may be received from another vehicle in a peloton. Road conditions can be forecast from forward looking sensors on the vehicle itself. Wheel slip and wheel skid measured by a front wheel is transmitted to the adaptive field-oriented motor control of the tandem rear wheel. Wheel loading sensors and actuators provide direct feedback on attainable torque. As a result the invention determines torque target requests before the user can see the impending condition.

A system for deep autonomous vehicle control allocates positive and negative torque to each wheel. A sensor system, navigation system, and control system generally control speed and direction of a vehicle. An adaptive torque control system replaces conventional throttle and braking systems. This system improves performance and reduces reliance on the steering system for skidding and slipping conditions due to dynamic traction and loading.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

In these embodiments, computing devices once embedded in this real-time closed loop control system, lose their generic capability for executing instructions other than continuously responding to physical measurements of indicia by setting electrical magnitudes and frequencies.

One aspect of the invention is an apparatus for transformation of vehicle operator intentions to wheel controller commands comprising: a vehicle control interface (drivers); a sensor reception interface (sensors); a vehicle/driver personality profile store (personality store); the personality store coupled to the driver and the sensors by an application programming interface (API); a torque budgeting circuit coupled to the API; and a motor controller interface coupled to the personality store by the API.

In an embodiment, the sensors receive acceleration, yaw, speed, direction, vertical loading, traction, and road condition measurements.

In an embodiment, the drivers receives the operator's desired acceleration and vehicle yaw intentions.

In an embodiment, the motor controller interface transmits commands for torque to each motor controller.

In an embodiment, the torque budgeting circuit determines a torque for each wheel to cause the vehicle to converge toward the driver intention as shaped by the personality store.

In an embodiment, the personality store contains parameters accessible by an API to reflect an operator's skills in damping oscillations, reaction speed, observation acuity, muscularity, and hand-eye coordination.

In an embodiment, the personality store further contains parameters accessible by an API to delay the application of torque to the vehicle's actual or emulated performance characteristics and to add torque forces to simulate another vehicle's responsiveness to yaw and acceleration intentions.

Instructions and parameters that control dynamic vehicle responsiveness and reflect an operator's personality are accessible by an application programming interface (API). In an embodiment torque controlled electric motors may be attached to non-wheel traction mechanisms such as fans, propellers, airscrews, caterpiller drives, paddles, and powered legs.

DriveApps would be loaded either on the central computer (VCU) or a separate user-provided computer that couples to vehicle CANbus.

DriveApp architecture allows multiple apps. Examples include:

Sports car
A tow trailer
AWD ATV
AWD SUV
multiple-motor water or ice/snow vessel
multiple-motor aircraft, and
dual powered wheelchair or personal transporter.

Figure 1:
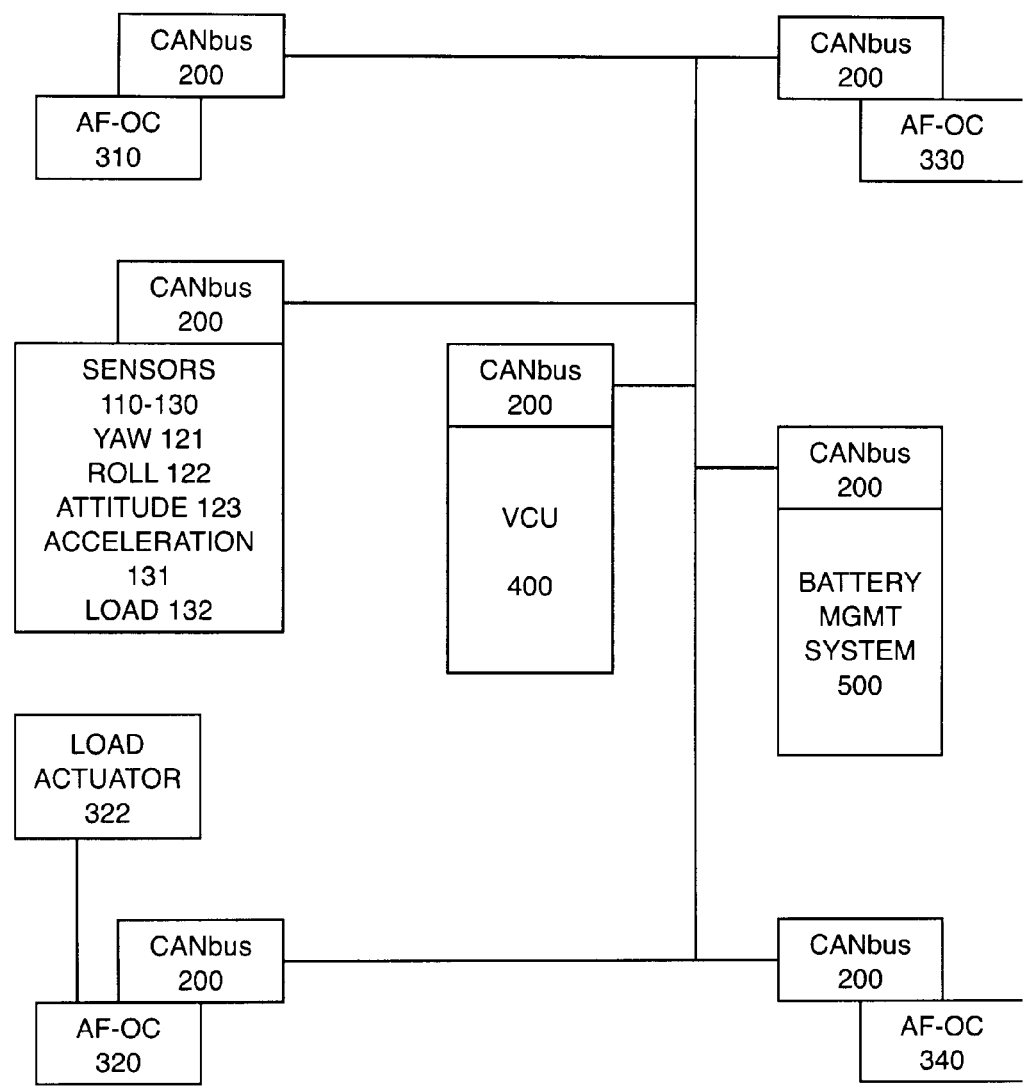
FIG. 1 is a block diagram of a system.

Referring to FIG. 1, a system 100 illustrates an embodiment wherein API calls are performed via sending a controller area network (CAN) command into the traction CANbus 200. CAN ID defines recipient of the command—each inverter also called an Adaptive Field-Oriented Controller (AF-OC) circuit 310-340 has a CAN ID, as does Vehicle Control Unit (VCU) apparatus 400 and Battery Management System (BMS) circuit 500. All other subsystems are controlled from within these modules (e.g., wheel #2 load actuator 322 is controlled from inverter #2 e.g. AF-OC-2, 320 etc.) A plurality of sensors 110-130 provide measurement packets of yaw 121, roll 122, attitude 123, acceleration 131, load 132, etc.

Figure 2:
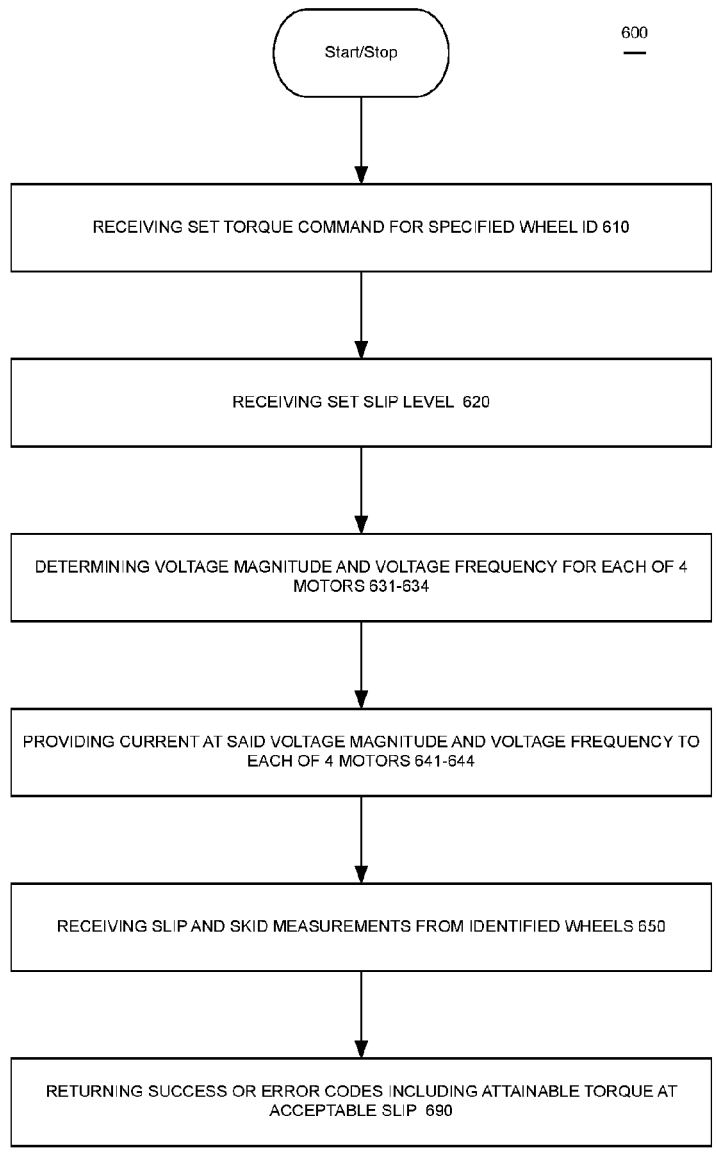
FIG. 2-5 are flowcharts of processes in a method of operation of the components of apparatuses of the system.

Low-level (per-inverter) APIs include:
a. setTorque(wheel, torque, duration_ms)
i. requests torque output of <torque>N*m from <wheel> wheel for <duration_ms> milli-seconds
ii. returns 0 on success, non-0 on error (error codes TBD)
b. setSlipLevel(wheel, level)—sets level of aggressiveness of slip control (low=street car use, high=race track)
c. getTorque(wheel)—return torque value actually delivered
d. getLoad(wheel)—get wheel loading in Newtons
e. getRPM(wheel)—get RPM of the wheel
f. getSlipAngle(wheel)—get actual sleep angle Referring to FIG. 2 a method of operation 600 is illustrated that includes at a field oriented motor controller coupled to a network, receiving a set torque command 610 which specifies a wheel identifier, a value of target torque, and a duration wherein torque is in units of Newton*meters, and duration is in units of milliseconds; receiving a set slip level 620 as an acceptable percentage of rotation; determining a voltage magnitude and voltage frequency 631-634 for a motor; providing n-phase electric current at said voltage magnitude and voltage frequency 641-644; receiving slip and skid measurements 650 from the identified wheel; and returning success or error codes 690, which include the attainable torque at acceptable slip.

Mid-level (traction system—level) APIs include measurements of Rate of change in vehicle position in 3-dimensional polar coordinates:
getYawRate( )—get yaw rate in degrees/second from yaw sensor
getRollRate( )—get roll rate in degrees/second from roll sensor
getAttitudeRate( )—get attitude rate in degrees/second from attitude sensor
getAccel( )—get vehicle acceleration in mm/s^2 (1 g=9,800 units)
getLoad( )—get total vehicle weight (dynamic, can be different from weight at rest due to aerodynamic lift etc)
get[max/min][params]( )—get min and max values of the parameters from the per-inverter level. Example:
int getMaxSlipAngle( ) and,
setAccel(accel)—request acceleration of the vehicle in mm/s^2 (can be positive or negative).

Figure 3:
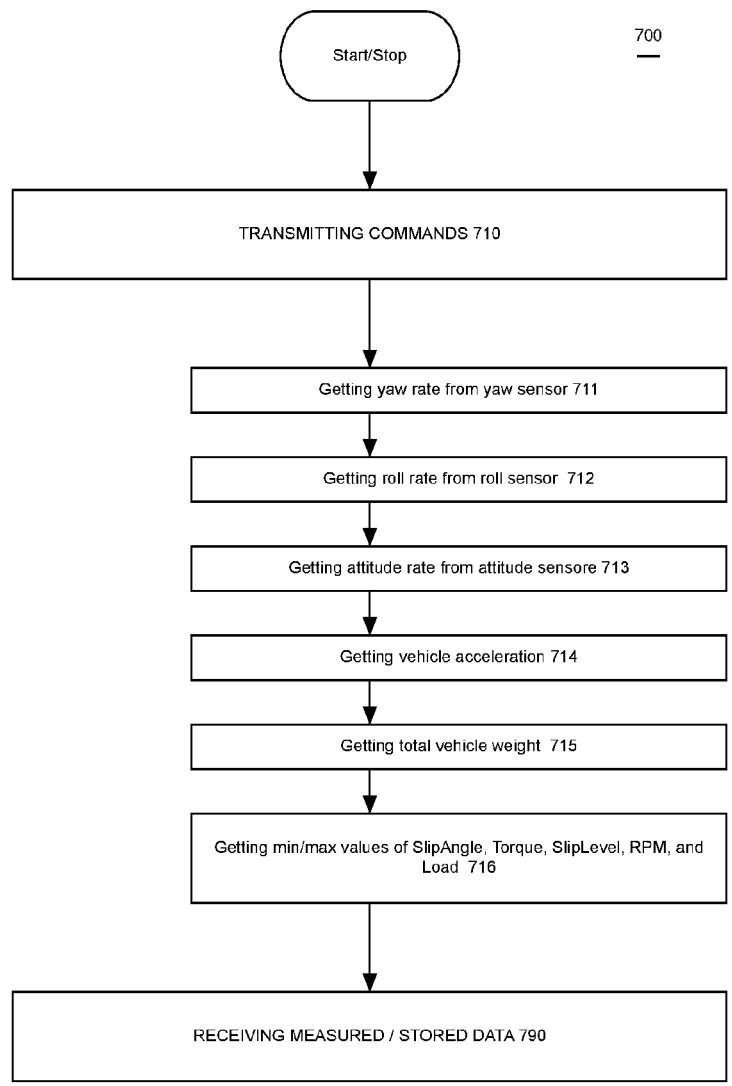

Referring now to FIG. 3 a method 700 is illustrated for control of a vehicle by a processor performing the steps of a process including transmitting commands 710 and receiving measured or stored data 790. In an embodiment, each sensor responds when it is addressed. In an embodiment, all sensors having the requested data respond in order when no address is specified in the command. In embodiments the commands and resulting data including at least one of the following: getYawRate—get yaw rate in degrees/second from yaw sensor 711; getRollRate—get roll rate in degrees/second from roll sensor 712; getAttitudeRate—get attitude rate in degrees/second from attitude sensor 713; getAccel—get vehicle acceleration in mm/s^2 (1 g=9,800 units) 714; getLoad—get total vehicle weight (dynamic, can be different from weight at rest due to aerodynamic lift etc) 715; and get[max/min][params]( )—get min and max values of the parameters SlipAngle, Torque, SlipLevel, RPM, and Load 716.

Figure 4:
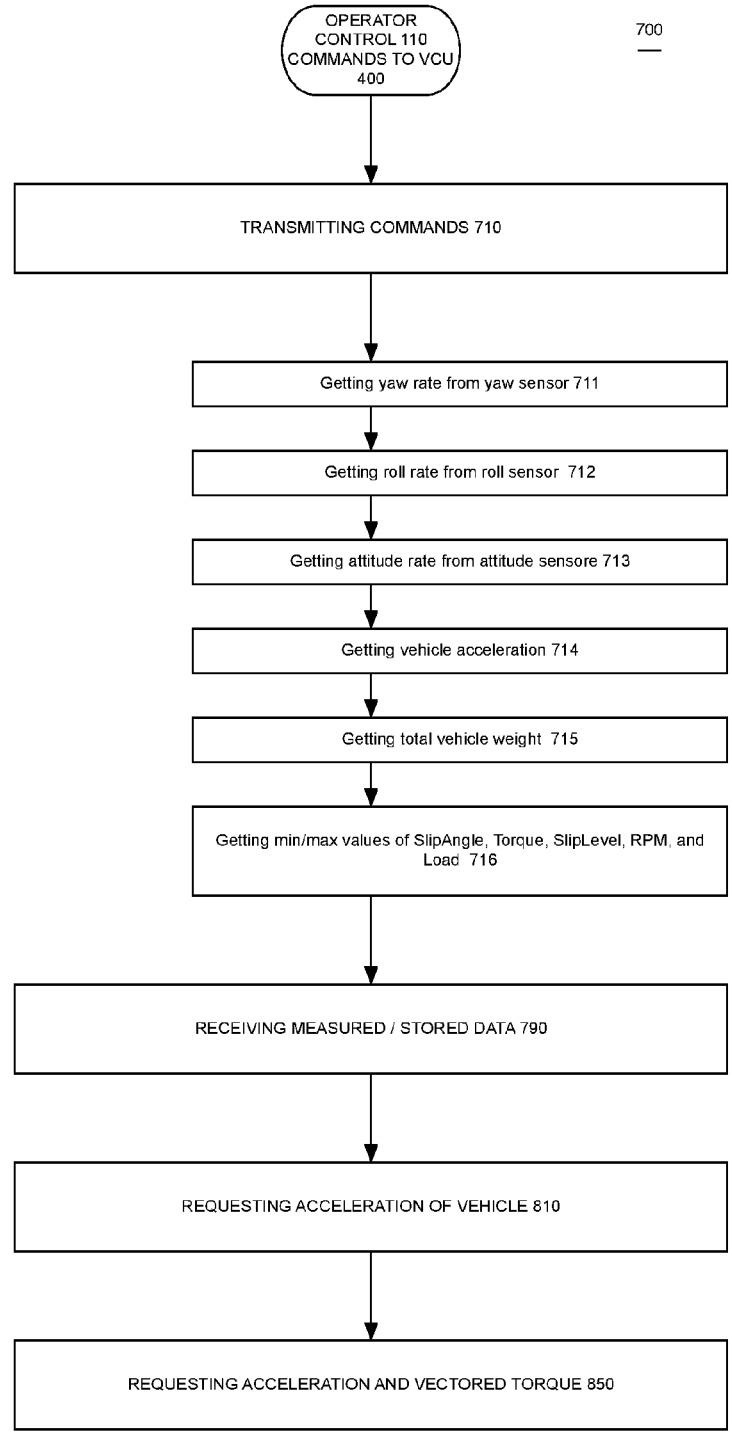

In an embodiment illustrated in FIG. 4, an operator control 110 transmits to a vehicle control unit 400 a command to setAccel(accel) 810—request acceleration of the vehicle in mm/s^2 (can be positive or negative). In an embodiment, an autonomous vehicle control system is coupled by an API to the vehicle control unit to request acceleration and vectored torque 850.

High-level (car-level) API's includeBattery Management System (BMS) functions:
i. getBattSOC( )—get state of charge of the battery in %
ii. getBattAH( )—get remaining energy in the battery in AH (amp-hours)
iii. getBattKWH( )—same in KWHrs
iv. getBattV( )—get current battery voltage—used by VCU to predict maximum possible power band
v. getBattIR( )—get current internal resistance of the battery—used by VCU to predict maximum possible power band and
vi. getMaxBattPower( )—get max battery power in kW. Used in VCU (Vehicle Control Unit) to understand how much power is available to distribute into wheels.

Figure 5:
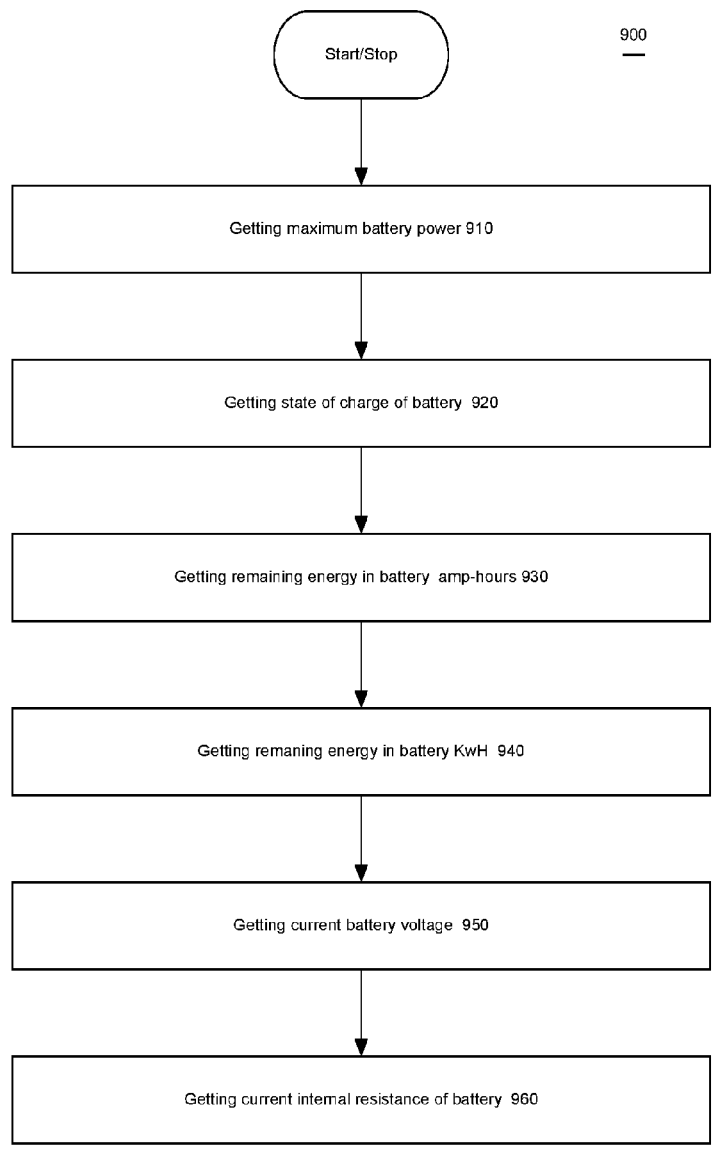

Referring to FIG. 5, a method 900 is illustrated for operating a vehicle by a processor in a vehicle control unit coupled by a network to a battery management system includes transmitting commands to read parameters including at least one of the following: to get maximum battery power in kW: getMaxBattPower 910; to get state of charge of the battery in percent: getBattSOC 920; to get remaining energy in the battery in ampere-hours: getBattAH 930; to get remaining energy in the battery in kilowatthours: getBattKWH 940: to get current battery voltage: getBattV 950; to get current measured internal resistance of the battery: getBattIR 960.

A system for predictive torque budgeting receives traction estimates for impending road conditions. Traction measurements from previously recorded measurements can be retrieved using global positioning coordinates. Road geometry and incline is predicted from a stored 3D map. Traction measurements may be received from another vehicle in a peleton. Road conditions can be forecast from forward looking sensors on the vehicle itself. Wheel slip and wheel skid measured by a front wheel is transmitted to the adaptive field-oriented motor control of the tandem rear wheel. Wheel loading sensors and actuators provide direct feedback on attainable torque.

In an embodiment, the system receives predicted yaw events from a map, gps system, user goggles or heads up display.

Intelligent traction prediction engine—data sources:
maps (curve ahead, etc) and GPS waypoints.
GPS waypoints and prior experience on same route
photo sensors before the front wheel to predict surface traction (camera looking out 1 foot ahead will give us 10 ms time at 60 mph to modulate front wheel)
traction information from the front wheel fed into torque commands to the rear wheels (that will see the same part of pavement in ~100 ms at 60 mph)
wheel loading sensors & actuators (to actively manage instantaneous wheel loading)

In an embodiment, a rear wheel AF-OC circuit adjusts its voltage magnitude and frequency magnitude output when a front wheel AF-OC circuit determines a target torque cannot be attained or sustained, or transmits substantially large slip data, skid data, or stability data.

In an embodiment a torque budgeter circuit adjusts the target torque for rear wheel AF-OC circuits when at least one front wheel AF-OC circuit determines a target torque cannot be attained or sustained, or transmits substantially large slip data, skid data, or stability data.

A method provides through an API, a process to adaptively control thrust instead of throttle and brake operation. The vehicle control unit receives acceleration requirements from the higher level autonomous systems and determines positive or negative torque for each electric motor driven wheel.

It can be appreciated that the circuits may be implemented by processors using real time customized software closely coupled to physical measurements and resulting torque assignments in Newton meters transmitted to each motor controller. The physical manifestation of the invention is electric current magnitude or voltage magnitude and a poly-phase frequency or phase angle provided to a motor. Because of the dynamic nature of controlling a vehicle, the transformation method cannot be performed mentally or using manual computations.

It is understood that circuits described above can be implemented as digital logic gates in a mask programmed standard cell or gate array. The circuits may equally be embodied in a programmable logic device depending on fuses or electrically erasable flash memory or firmware. The circuits may equally be embodied in Field Programmable Gate Arrays configured by non-transitory storage such as flash or read only memories (ROM). The circuits above may equally be embodied as processors adapted by instructions in non-transitory storage to perform the specific logic functions.

CONCLUSION

Based on the traction prediction method, the apparatus provides target torque requests. The results include matching a rear wheel to its corresponding front wheel; placing more energy on the rear axle wheels and less on the front axle wheels for climbing, anticipating tighter cornering and providing positive torque to a left side or providing negative torque to a right side or vice versa or both. In some cases, negative torque is provided to one rear wheel while positive torque is provided to the diagonally opposite wheel. The system anticipates desired yaw moments for the route and road conditions.

The claimed subject matter is easily distinguished from conventional vehicle performance characteristics by modifying through reading and writing parameters through an application programming interface the dynamic performance of the vehicle in response to user control, skills, and road conditions. Adjusting the behavior for towing or various loads can be done by installing an amended profile. Adapting the vehicle for a novice driver can be done as needed by downloading a plug-in.

The techniques described herein can be implemented in digital electronic circuitry, or in computer hardware, firmware, software, or in combinations of them. The techniques can be implemented as an embedded microcontroller, i.e., firmware tangibly embodied in a non-transitory medium, e.g., in a machine-readable storage device, for execution by, or to control the operation of circuit apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and connected by a wireless network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices. The processor and the memory can be supplemented by, or incorporated in special purpose logic circuitry.

The claimed subject matter is easily distinguished from conventional traction control by obtaining measurements from front wheels, sensors, telemetry from other vehicles, or stored measurements associated with global positioning coordinates instead of operator selection of modes.

The claimed subject matter is easily distinguished from conventional autonomous vehicle systems by further sensing individual wheel slip and skid and budgeting torque for each motor controlling an individual wheel. A conventional autonomous vehicle depends on throttle control and braking actuators to provide positive or negative torque. The present invention provides an API interface between the navigation and environmental sensor system and the torque control system.

A number of embodiments of the invention have been described. Nevertheless, it will be understood that various modifications may be made without departing from the spirit and scope of the invention. For example, other network topologies may be used. Accordingly, other embodiments are within the scope of the following claims.

We claim:

1. An apparatus for transformation of vehicle operator intentions to wheel controller commands comprising:
a vehicle control interface;
a sensor reception interface (sensors);
a vehicle/operator personality store (personality store);

the personality store coupled to the vehicle control interface and to the sensors by an application programming interface (API);
a torque budgeting circuit coupled to the API; and
a motor controller interface coupled to the personality store by the API;
wherein the sensors receive acceleration, yaw, speed, direction, vertical loading, traction and road condition measurements;
wherein the personality store contains parameters accessible by an API to reflect an operator's skills in damping oscillations, reaction speed, observation acuity, muscularity, and hand-eye coordination;
and wherein the torque budgeting circuit comprises a processor configured to determine a torque for each wheel to cause the vehicle to converge toward the driver intention as shaped by the personality store by instructions encoded in non-transitory medium in executable form.

2. The apparatus of claim 1 wherein the personality store further comprises computer-readable parameters encoded in non-transient media, accessible by the API to delay the application of torque to a first vehicle's actual or emulated performance characteristics and to add torque forces to simulate a second vehicle's responsiveness to yaw and acceleration intentions.

* * * * *